US008706176B1

(12) United States Patent
Jia et al.

(10) Patent No.: US 8,706,176 B1
(45) Date of Patent: Apr. 22, 2014

(54) CELL PHONE PROTECTOR CASE HAVING THE COMBINATION OF A SOFT EXTERIOR SHELL AND AN INTERIOR HARD SHELL

(71) Applicants: Jun Jia, Guangdong (CN); Lihui Zhang, Guangdong (CN)

(72) Inventors: Jun Jia, Guangdong (CN); Lihui Zhang, Guangdong (CN)

(73) Assignee: Valor Communication, Inc., City of Industry, CA (US)

( * ) Notice: Subject to any disclaimer, the term of this patent is extended or adjusted under 35 U.S.C. 154(b) by 0 days.

(21) Appl. No.: 13/705,745

(22) Filed: Dec. 5, 2012

(51) Int. Cl.
*H04M 1/00* (2006.01)
(52) U.S. Cl.
USPC ........ 455/575.8; 220/660; 220/664; 206/305; 206/320; 206/372; 206/373; D14/250; 361/679.55; 361/679.56
(58) Field of Classification Search
USPC ........ 455/575.8; 220/660, 664; 206/305, 320, 206/372, 373; 361/679.55, 679.56; D14/250
See application file for complete search history.

(56) References Cited

U.S. PATENT DOCUMENTS

| 7,343,184 | B2 | 3/2008 | Rostami |
| D606,305 | S * | 12/2009 | Lee et al. ........................ D3/269 |
| 8,034,441 | B2 | 10/2011 | Lefebvre et al. |
| 8,190,222 | B2 | 5/2012 | Cheng |
| 8,204,561 | B2 * | 6/2012 | Mongan et al. ............ 455/575.8 |
| D662,925 | S * | 7/2012 | Mayberry et al. ........... D14/250 |
| 8,245,842 | B2 | 8/2012 | Bau |
| 8,439,191 | B1 * | 5/2013 | Lu ................................ 206/320 |
| 8,509,865 | B1 * | 8/2013 | LaColla et al. ............ 455/575.8 |
| D694,742 | S * | 12/2013 | Pan ............................ D14/250 |
| 2010/0062816 | A1 | 3/2010 | Yu |
| 2012/0071217 | A1 * | 3/2012 | Park ........................... 455/575.8 |
| 2012/0115551 | A1 * | 5/2012 | Cho et al. ..................... 455/566 |
| 2012/0217257 | A1 | 8/2012 | Ting |

FOREIGN PATENT DOCUMENTS

| CN | 201114197 Y | 9/2008 |
| CN | 201418453 Y | 3/2010 |
| CN | 202311747 U | 7/2012 |

* cited by examiner

*Primary Examiner* — Olumide T Ajibade Akonai
(74) *Attorney, Agent, or Firm* — Thomas I. Rozsa

(57) ABSTRACT

A cell phone protector case including a combination of an interior hard shell and an exterior soft shell with three protrusion visible on each side o the rear surface of the exterior soft shell.

7 Claims, 10 Drawing Sheets

CELL PHONE PROTECTOR CASE HAVING THE COMBINATION OF A SOFT EXTERIOR SHELL AND AN INTERIOR HARD SHELL

BACKGROUND OF THE INVENTION

1. Field of the Invention

The present invention relates to the field of cell phone protector cases and in particular, cell phone protector cases which are designed to facilitate utilization of the cell phone while at the same time providing a protective covering to the cell phone so that the cell phone is not damaged if it is inadvertently bumped or dropped.

2. Description of the Prior Art

There are numerous designs for various cell phone protector cases that are known in the prior art. The following 10 patents and published patent applications are the closest relevant prior art:

1. U.S. Pat. No. 7,343,184 issued to Ramin Rostami on Mar. 11, 2008 for "Handheld Device Protective Case" (hereafter the "Rostami Patent");

2. United States Published Patent Application No. 2010/0062816 to Hsin Yuan Yu on Mar. 11, 2010 for "Mobile Phone Protective Cover" (hereafter the "Yu Published Patent Application");

3. U.S. Pat. No. 8,034,441 issued to Amy Lefebvre et al. on Oct. 11, 2011 for "Multilayer Composition" (hereafter the "Lefebvre Patent");

4. U.S. Pat. No. 8,190,222 issued to Chao-Yung Cheng on May 29, 2012 for "Housing For Electronic Device" (hereafter the "Cheng Patent");

5. U.S. Pat. No. 8,204,561 issued to Ryan Hill Mongan et al. on Jun. 19, 2012 for "One Piece Co-Formed Exterior Hard Shell Case With An Elastomeric Liner For Mobile Electronic Devices" (hereafter the "Mongan Patent");

6. U.S. Pat. No. 8,245,842 issued to Steven Chi Vun Bau on Aug. 21, 2012 for "Protective Case Having A Hybrid Structure For Portable Handheld Electronic Devices" (hereafter the "Bau Patent");

7. United States Published Patent Application No. 2012/0217257 to Shao-Chieh Ting on Aug. 30, 2012 for "Sleeve Structure For A Hand-Held Electronic Device" (hereafter the "Ting Published Patent Application");

8. Chinese Patent No. CN201114197Y issued to Shaoyou Chen on Sep. 10, 2008 for "Mobile Phones Protective Cover Possessing Soft Gum" (hereafter the "Chen Chinese Patent");

9. Chinese Patent No. CN201418453Y issued to Min Lu on Mar. 10, 2010 for "Novel Flexible Glue And Plastic Combined Protective Sleeve" (hereafter the "Lu Chinese Patent");

10. Chinese Patent No. CN202311747U issued on Jul. 11, 2012 for "Mobile Phone Protective Sleeve" (hereafter the "Chinese Patent No. CN202311747U").

The Rostami Patent deals with disclosing the concept of having a hard interior layer and a soft exterior layer but it has the requirement of a cavity into which one of the layers is inserted into a second layer cavity best shown in FIG. 2 as number 54. The independent claims of invention read as follows:

1. A protective case for a two-segment portable telephone comprising: a first segment, including a fitted cavity formed therein for mounting the associated segment of the portable telephone to the protective case; a second segment, separable from said first segment, including at least one fitted notch for mounting the associated segment of the portable telephone to the protective case; said first and second segments made up of: a protective inner layer composed of a hardened plastic; and a soft outer layer permanently affixed to the outside of said protective inner layer.

The Lefebvre Patent discloses a "Multilayer Composition". It discloses:

"The invention relates to a multi-layer acrylic composition having at least two impact modified layers. The outer layer is an acrylic layer containing impact modifiers having a particle size of less than 225 nm, and the impact modifiers in the inner thermoplastic layer have a particle size of greater than or equal to 225 nm. The invention also relates to multi-layer composites having the multi-layer acrylic composition on one or both sides. The multi-layer acrylic composition can also include blends of acrylic and fluoropolymers."

The Yu Published Patent Application discloses the combination of a plastic shell and a soft interior lining.

The Cheng Patent discloses in FIG. 1 a main body 11 and an outer covering 12. The main body 11 is of rigid material and provides mechanical strength. The outer cover which really only encircles the periphery of the main body provides soft tactile appeal and protects the housing and enclosed components from external shock.

The Mongan Patent for discloses a protective case 11 comprising two separate layers, a first external hard shell layer 12 and a second interior elastomeric layer 13. The only independent claim of this patent is claim 1 which reads as follows:

"A one-piece case for enclosing a personal electronic device comprising: a flexible inner layer co-molded with an exterior hard layer and permanently affixed together to form a co-molded one-piece assembly; wherein the co-molded one-piece assembly is sufficiently flexible to accept insertion of the personal electronic device and sufficiently rigid to securely retain the inserted personal electronic device, wherein: the flexible inner layer includes a bottom surface, side surfaces joined to the bottom surface and extending upward therefrom, and a fitted cavity configured to accept and retain the inserted personal electronic device such that the bottom surface covers at least a portion of a bottom surface of the inserted personal electronic device and the side surfaces cover at least a portion of a side surface of the inserted personal electronic device; the exterior hard layer includes a bottom surface and side surfaces sized and shaped to substantially cover an exterior of the bottom and side surfaces of the flexible inner layer and a cut away portion that is permanently filled with a portion of the co-molded flexible inner layer."

The Bau Patent discloses the concept of a "Protective Case Having A Hybrid Structure For Portable Handheld Electronic Devices". The relevant portion of the patent reads as follows:

"Reference is made to FIGS. 1-20. FIG. 11 shows the example of an electronic device in the form of a smart phone 10 (in the illustration, the electronic device resembles an Apple iPhone) held by a protective case 12 in accordance with one embodiment of the present invention. The protective case 12 exposes the display screen of the phone 10, which could be a touch sensitive screen for user interaction (e.g., user selections by tapping on the icons displayed on the screen). The commercial product implementing the present invention under this embodiment is generally referred to as the "Rebel" product. It comprises a 2-piece rear protective structure; including a tough but soft cover piece (the "glove" or "skin") 14 and a hard frame 16.

The tough but soft glove 14 protects the phone's highly polished back from getting scratched. It snugly covers the entire back panel and the perimeter of the phone 10, like a skin, and exposes screen at the front of the phone 10. The glove 14 is of unitary, one-piece or monolithic structure. The glove 14 is partially covered with a hard plastic flexible exoskeleton frame 16 that grips from the back of the phone 10 and around the phone's edges and corners, thereby completely protecting the housing of the phone.

The Ting Published Patent Application discloses a "Sleeve Structure For A Hand-Held Electronic Device". Referring to the abstract, the patent application discloses:

"A sleeve structure for a hand-held electronic device is assembled by a hard back cover and a soft plastic collar to enclose a hand-held electronic device, especially a tablet personal computer or a mobile phone. The hard back cover is made by Arcly and an entire surface manifests a pattern of diamonds to facilitate holding by a hand and increase fanciness and brightness. An inner surface of the back cover can be glued and attached with a laser reflection sticker which is printed with a pattern or can be processed with electroplating, depending on a shape design of the tablet personal computer or the mobile phone, thereby achieving fanciness and brightness. In addition, the soft plastic collar to enclose peripheries can prevent from scratching."

The Chen Chinese Patent is for a mobile phone protective case possessing soft gum. Specifically, the patent discloses:

"The utility model relates to a protective shell of a mobile phone, in particular to a mobile phone protective shell with soft glue, which comprises a hard plastic protective shell (1) matched with the shape of the mobile phone; the utility model is characterized in that: the protective shell (1) has a laminate structure; the surface of the protective shell is covered with a soft glue film (2). The mobile phone protective shell with soft glue is comfortable in handle and uneasy to slip from hands, and, in particular, provided with the soft glue film matched with a hidden arrow shape in a keyboard position, thereby preventing dust and sweat and being convenient for key-press operation and more suitable for practicality."

The Lu Chinese Patent was published in 2009 and discloses:

"A novel flexible glue and plastic combined protective sleeve is characterized by the inclusion of a body 1 containing an electronic product, wherein the body 1 is formed by combining a plastic cover 2 and a flexible glue cover 3, the plastic cover 2 is a rigid plastic part, the flexible glue cover 3 is a soft flexible glue part, the plastic cover 2 adopts a plastic material to inject a required pattern, the flexible glue cover 3 takes a shape stamped by a soft flexible glue material and matched with profile of the such electronic products as a protected mobile phone, a MP3, MP4 and the like, the concave-convex pattern of a molding die is formed on the external surface of the flexible glue cover 3, the plastic cover 2 takes a shape matched with the concave-convex pattern on the surface of the flexible glue cover 3, thereby ensuring that the surface of the body 1 is flat and artistic after combination. A button position for clamping the appearances of such electronic products as the mobile phone, MP3, MP4, a camera, a mobile hard disk, a mobile computer and the like is arranged on the plastic cover 2. The utility model is capable of being produced industrially, and has the advantages of low cost and convenient use."

Chinese Patent No. CN202311747U discloses:

"The utility model provides a mobile phone a protective sleeve, which comprises a lower cover and the lower cover of the upper cover is connected with, the main body of the lower cover is a plane, the upper cover and the sheath body comprises a soft material on the inner shell includes surrounding four sides of the mobile phone with the states the side to encircle and the side wall of the upper shell, said upper shell is hollow. Lower cover of the mobile phone of the utility model the protective sleeve is not susceptible to elastic deformation of the material, is the protection of the back of the mobile phone of the front face of the drain on the outside as much as possible. In the process and in use, the force of the side of the mobile phone, the mobile phone will not fall off, effectively protecting the mobile phone."

There is a significant need for an improved cell phone protector case which has an interior hard shell and a soft exterior shell to provide added protection for the cell phone.

SUMMARY OF THE INVENTION

The present invention is a cell phone protector case comprising a combination of an soft exterior shell and an interior hard shell.

In detail, the present invention is a cell phone protector case comprising:

a. the combination of an interior hard shell and a soft exterior shell made out of material selected from the group consisting of silicone and soft rubber, the interior hard shell is comprised of an interior cell phone protector section and a matching retaining section, the interior cell phone protector section includes a first gap, a second gap and a third gap on its left sidewall and a first gap, a second gap and a third gap on its right sidewall, on the left sidewall spaced within the first gap is a first locking protrusion, spaced between the second and third gaps is a second locking protrusion, and spaced adjacent the third gap is a third locking protrusion, on the right sidewall spaced within the first gap is a first locking protrusion, spaced between the second and third gaps is a second locking protrusion, and spaced adjacent the third gap is a third locking protrusion;

b. on the left sidewall the first locking protrusion extends from the left sidewall onto a rear surface of the cell phone protector section, the second locking protrusion extends from the left sidewall onto the rear surface of the cell phone protector section, and the third locking protrusion extends from the left sidewall onto the rear surface of the cell phone protector section;

c. on the right sidewall the first locking protrusion extends from the right sidewall onto a rear surface of the cell phone protector section, the second locking protrusion extends from the right sidewall onto the rear surface of the cell phone protector section, and the third locking protrusion extends from the right sidewall onto the rear surface of the cell phone protector section;

d. the respective second locking protrusions are parallel to each other and the respective third locking protrusions are parallel to each other;

e. a matching retaining section includes matching protruding receiving members to receive and retain a respective protruding locking member from the cell phone protector section, the matching locking section has a left wall with a second protrusion receiving section with an opening to receive and retain the second locking protrusion from the left sidewall of the cell phone protector section, and a third protrusion receiving section with an opening to receive and retain the third locking protrusion from the left sidewall, the matching locking section has a right wall with a second protrusion receiving section with an opening to receive and retain the second locking protrusion from the right sidewall and a third protrusion receiving section with an opening to receive and a retain a third locking protrusion from the right sidewall;

f. the matching locking member has an opening surrounded by its sidewalls, an upper wall and a lower wall;

g. a soft exterior shell which is press fit retained onto the interior hard shell and its components, the soft exterior shell is made out of material selected from the group consisting of silicon and soft rubber, the soft exterior shell has a first sidewall having an exterior sidewall surface, a front surface and an interior side surface, the soft exterior shell has a second sidewall having an exterior sidewall surface, a front surface and an interior side surface, the soft exterior shell has a lower sidewall having an exterior sidewall surface, a front surface and an interior side surface, the soft exterior shell has a top sidewall having an exterior sidewall surface a front surface and an interior side surface, the four walls extend to a rear wall having an exterior surface 2 and an interior surface;

h. on the soft exterior shell, the respective interior sidewall surfaces and interior surface of the rear wall form a pocket into which is press fit retained the interior hard shell with its rear surface pressed against interior surface and exterior sidewall surfaces respectively pressed against the interior sidewall surfaces of the soft exterior shell;

i. the rear wall of the soft exterior shell has openings so that each of the three protrusions from the left and right sidewalls of the hard interior shell are visible through respective matching openings extending through the rear surface of the soft exterior shell; and j. the rear surface and sidewalls of the soft outer shell have a multiplicity of bumps thereon.

The cell phone protector case further comprises the interior hard shell case and its components are made of hard plastic.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
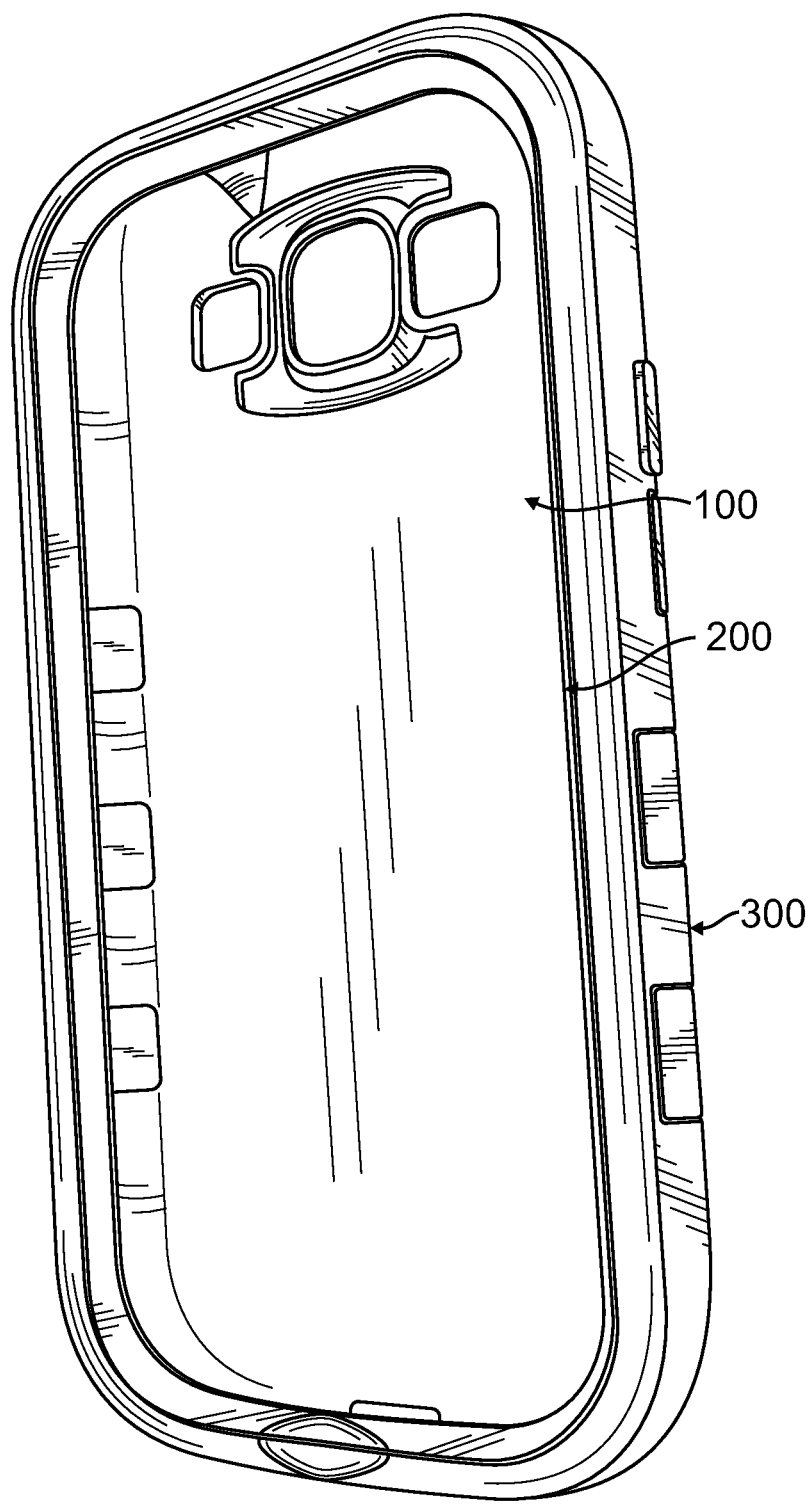
FIG. 1 is a front perspective view of the entire cell phone protector case of the present invention.
Figure 2:
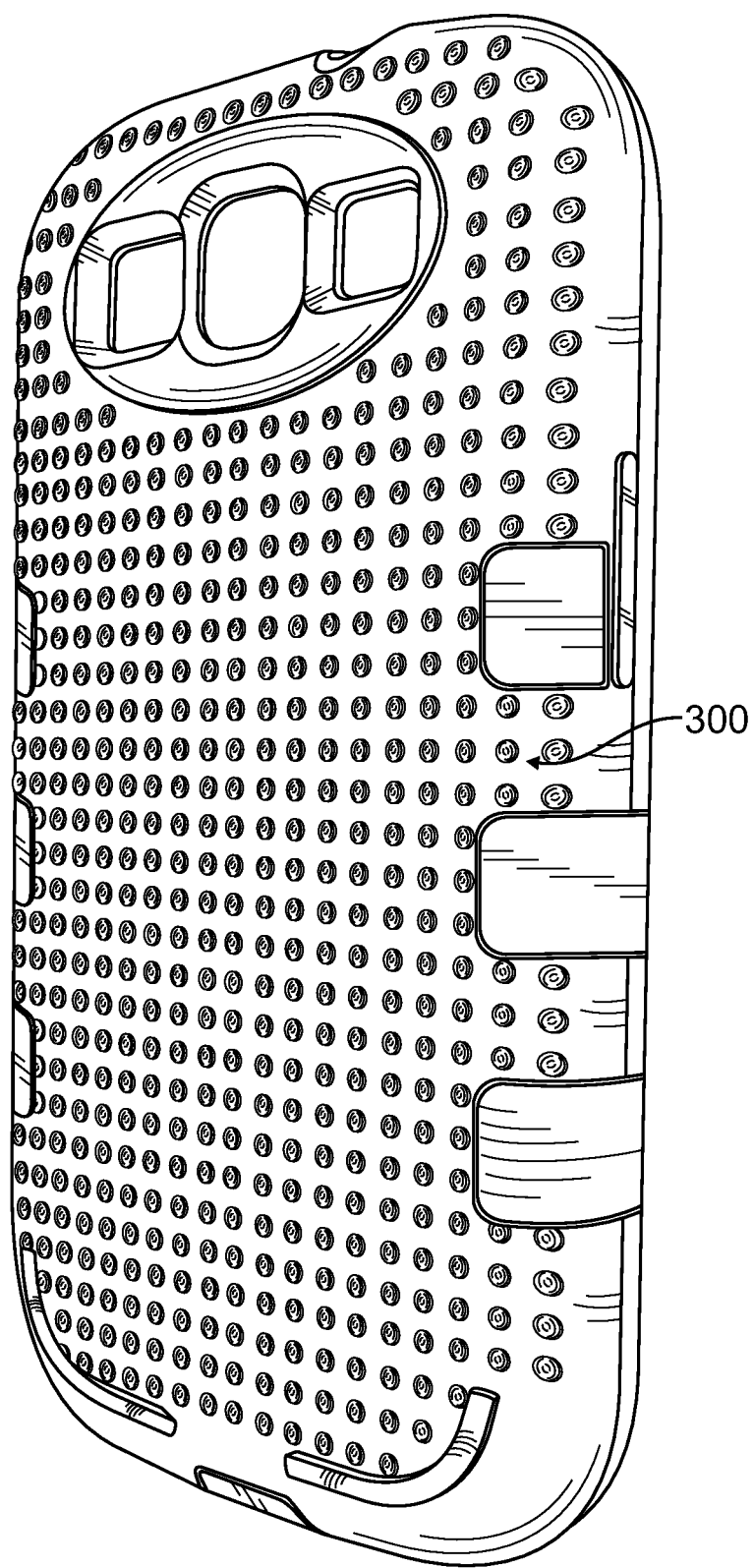
FIG. 2 is a rear perspective view of the entire cell phone protector case of the present invention.
Figure 3:
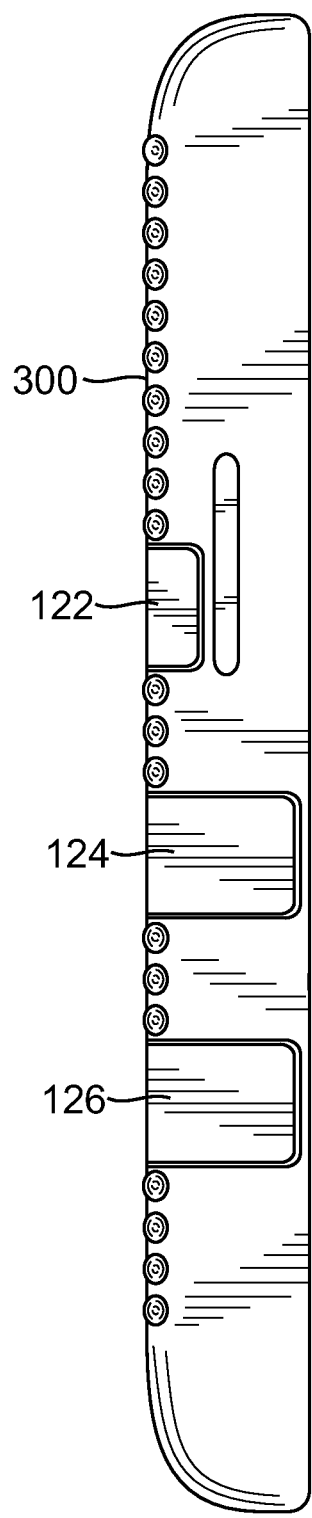
FIG. 3 is left side elevational view of the entire cell phone protector case of the present invention.
Figure 4:
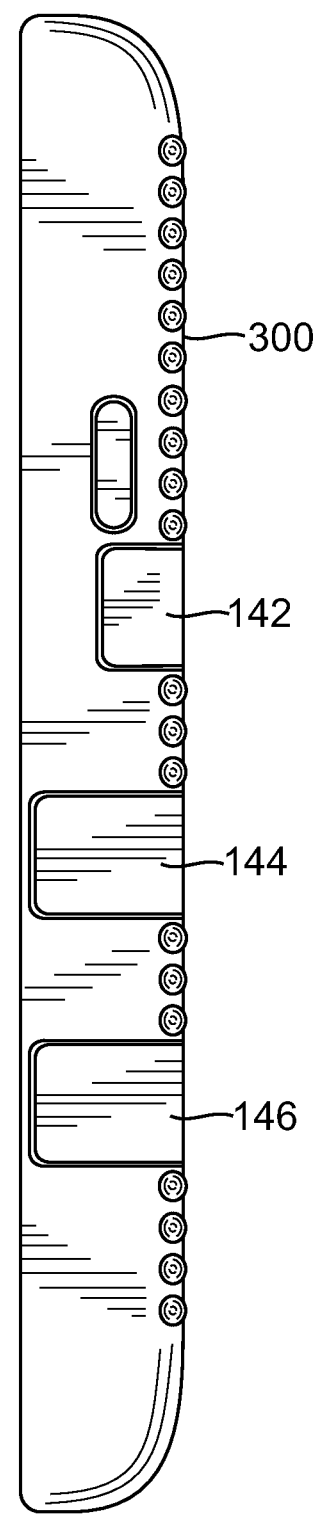
FIG. 4 is a right side elevational view of the entire cell phone protector case of the present invention.
Figure 5:
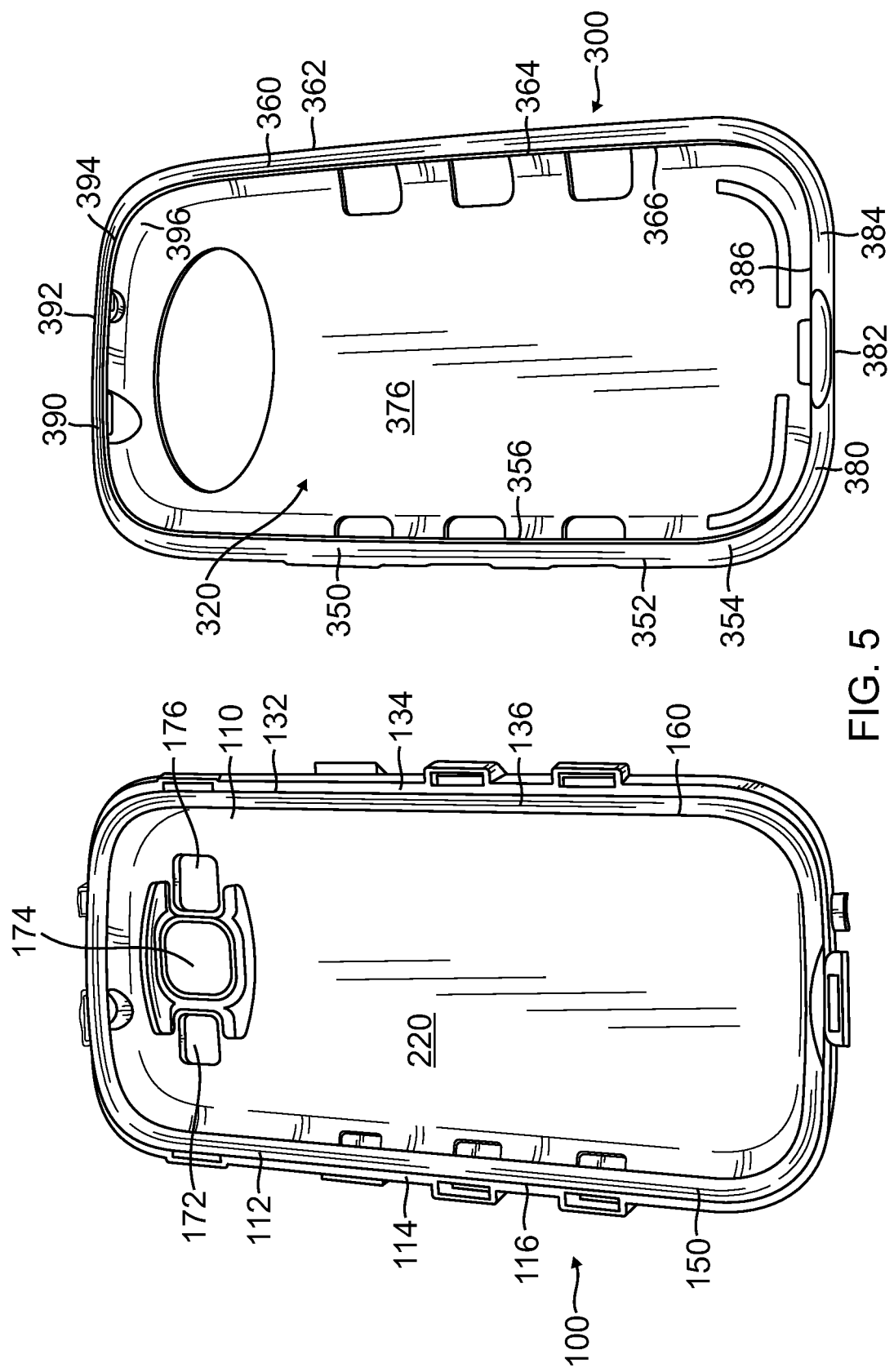
FIG. 5 is a front elevational view of the present invention cell phone protector case separated into its interior hard shell on the left and its exterior soft shell on the right.
Figure 6:
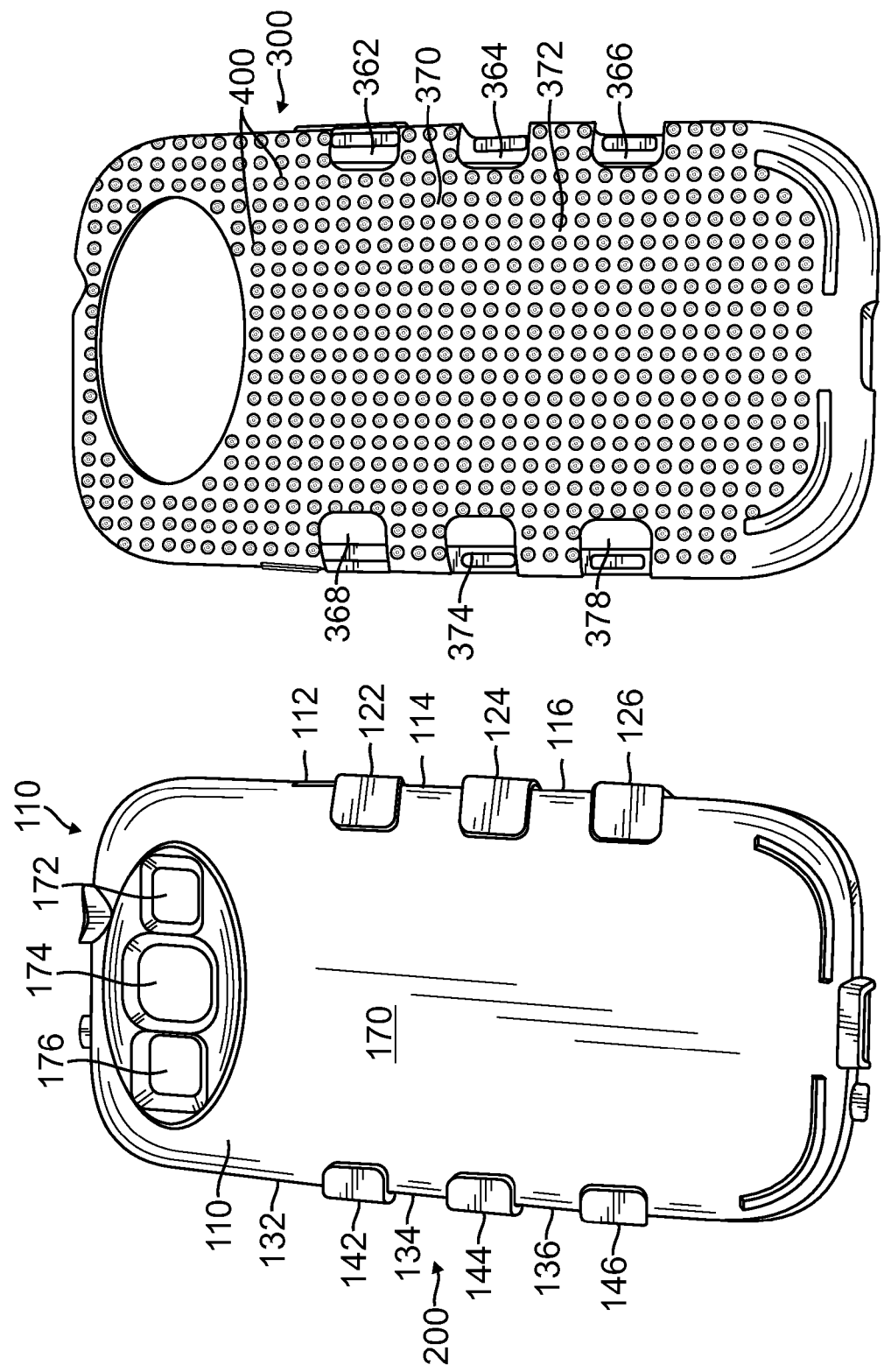
FIG. 6 is a rear elevational view of the present invention cell phone protector case separated into its interior hard shell on the left and its exterior soft shell on the right.
Figure 7:
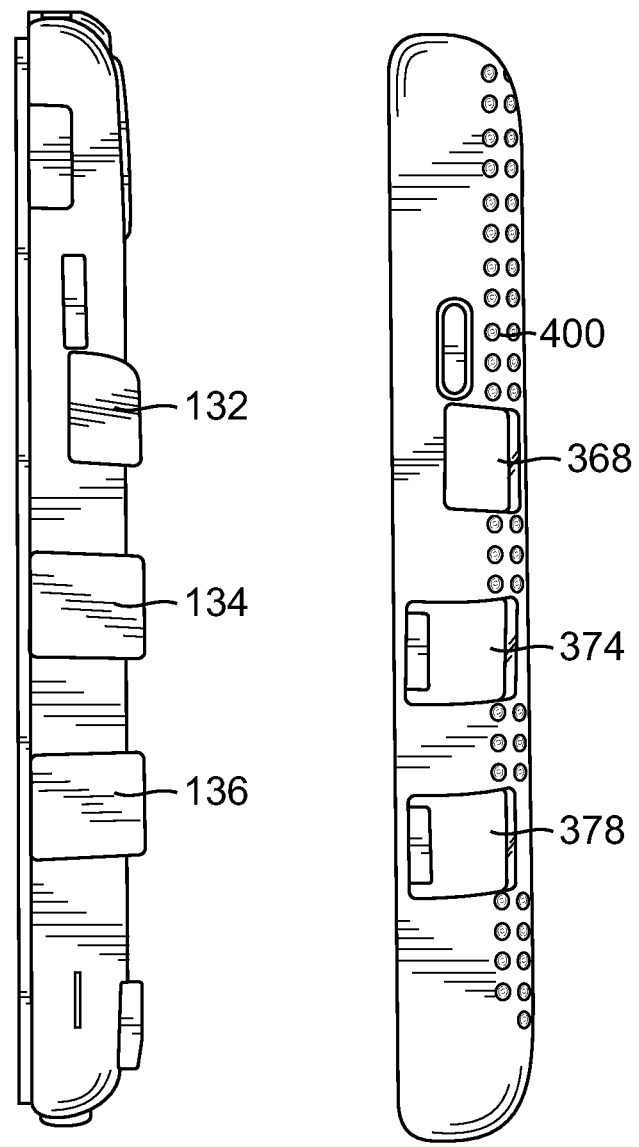
FIG. 7 is a right side elevational view of the present invention cell phone protector case separated into its interior hard shell on the left and its exterior soft shell on the right.
Figure 8:
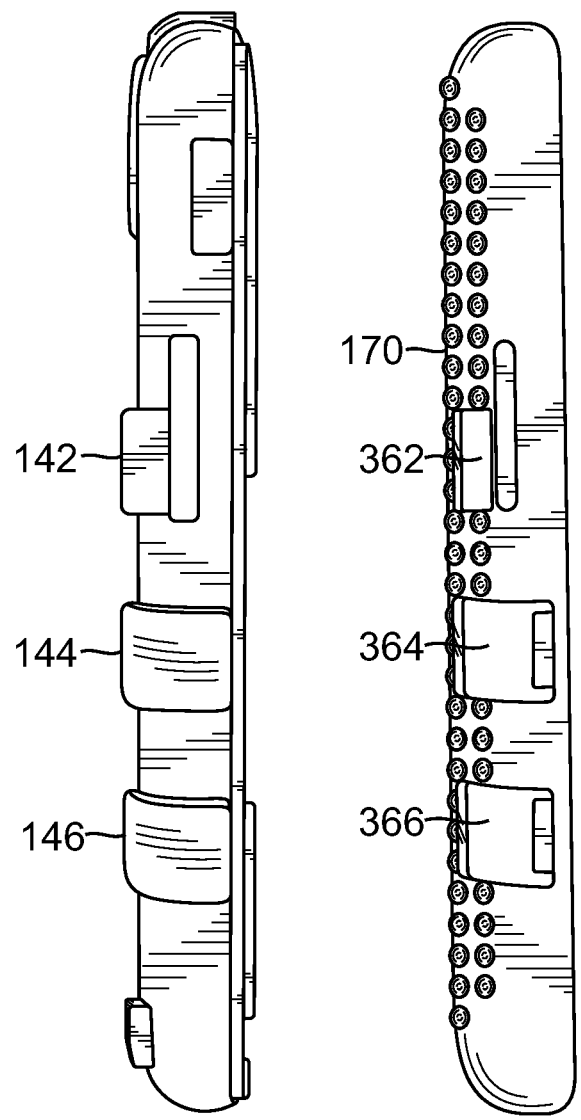
FIG. 8 is left side elevational view of the present invention cell phone protector case separated into its interior hard shell on the left and its interior soft shell on the right.
Figure 9:
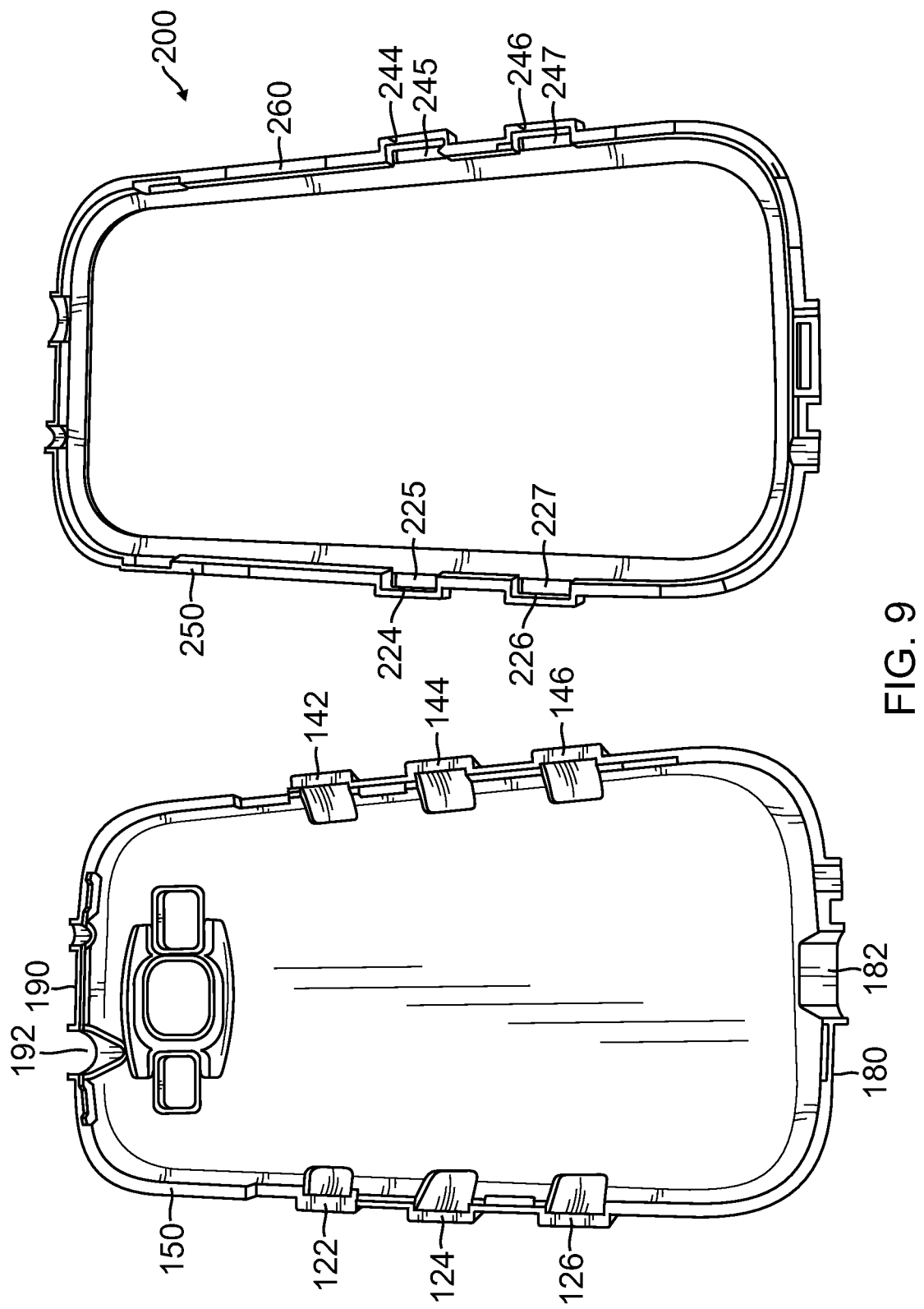
FIG. 9 is a front elevational view of the two components of the interior hard shell with the locking member on the left and the cell phone retaining member on the right.
Figure 10:
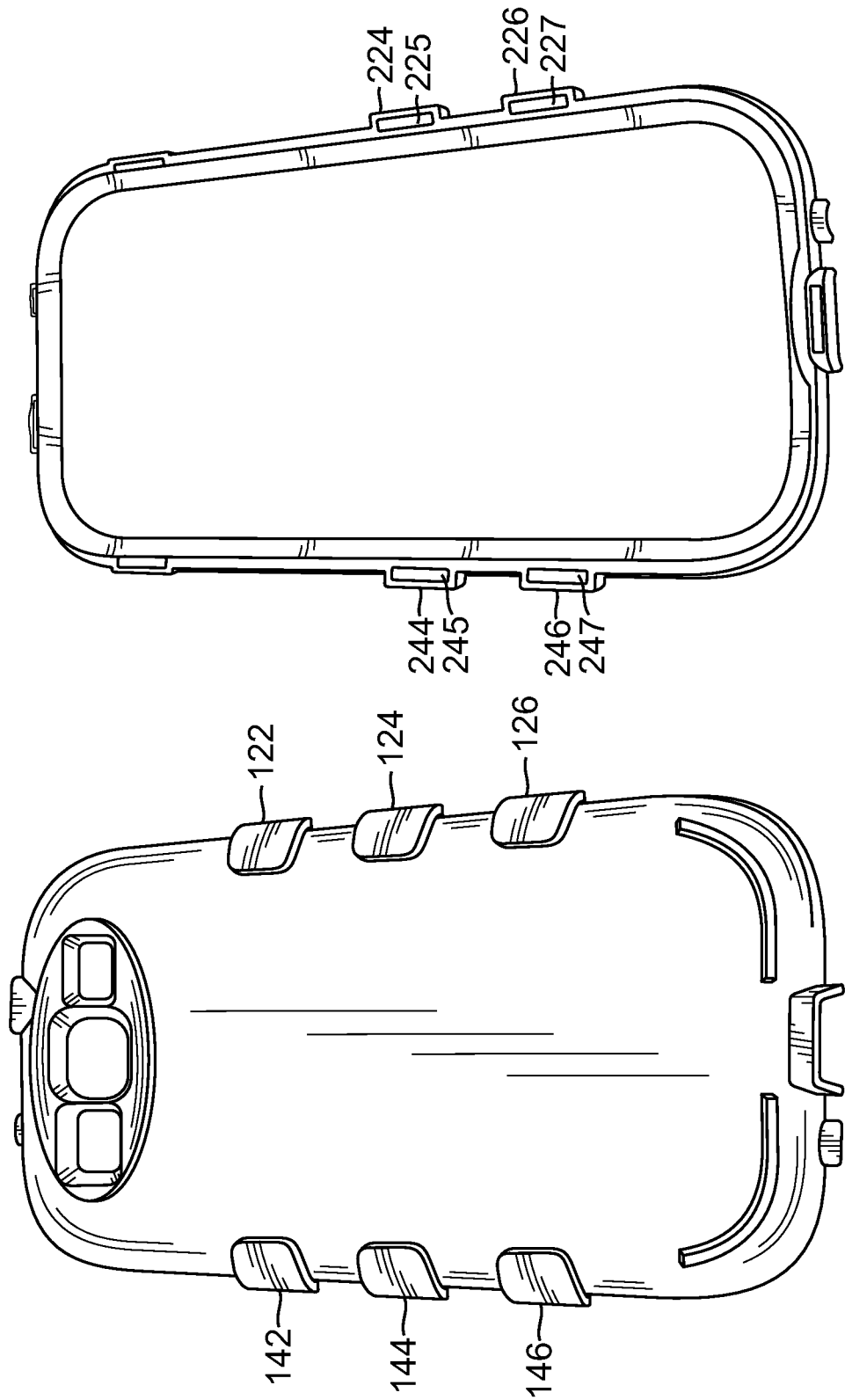
FIG. 10 is a rear elevational view of the two components of the interior hard shell with the locking member on the left and the cell phone retaining member on the right.
Figure 11:
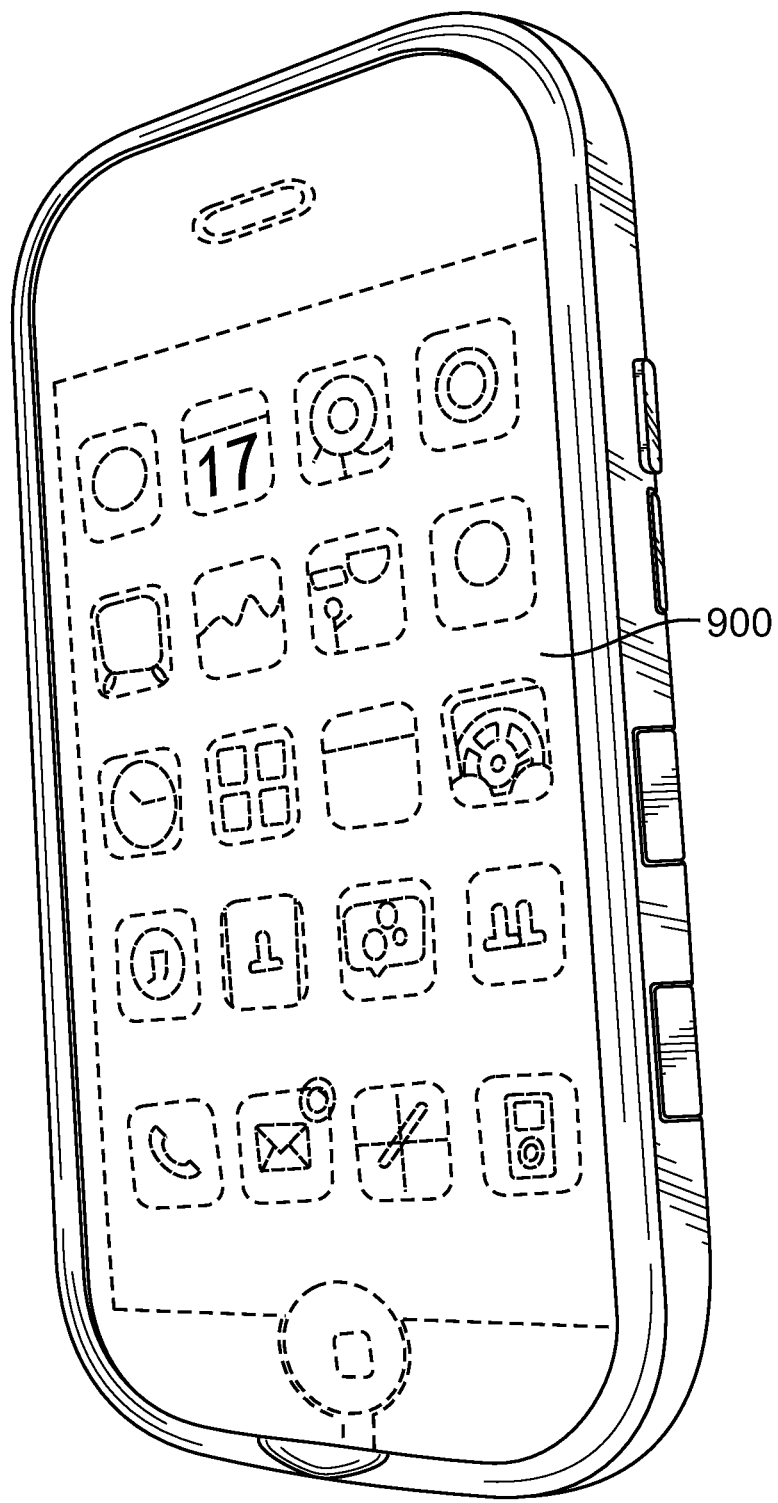
FIG. 11 is a perspective view illustrating a cell phone retained within the present invention.

Referring to FIGS. 1 through 12, the present invention cell phone protector case having the combination of an interior hard shell made out of material selected from the group consisting of hard plastic, polyvinyl and polyurethane and a soft exterior shell made ut of material selected from the group consisting of silicone and soft rubber is illustrated in the assembled form without the cell phone contained therein in FIGS. 1 through 3.

The present invention comprises two primary components. The first significant component is the interior hard shell which is numbered 100 which itself comprises two sub-components, an interior cell phone protector section 110 and a matching retaining section 200 which locks the cell phone 900 into the interior cell phone protector section 110. The interior cell phone protector section 220 includes three spaced apart gaps 112, 114 and 116 on its left sidewall 150 to accommodate control members on the left side of the cell phone and three space apart gaps 132, 134 an 136 on its right sidewall 160 to accommodate control members on the right side of the cell phone. Spaced within gap 112 is locking protrusion 122. Spaced between gaps 114 and 116 is locking protrusion 124. Spaced adjacent one end of gap 116 is locking protrusion 126. Spaced between gaps 132 and 134 is locking protrusion 142. Spaced between gaps 134 and 136 is locking protrusion 144. Spaced adjacent gap 126 is locking protrusion 146.

Locking protrusion 122 extends from sidewall 150 onto rear surface 170 of cell phone protector section 110. Locking protrusion 124 extends from sidewall 150 onto rear surface 170. Locking protrusion 126 extends from sidewall 150 onto rear surface 170. Locking protrusion 142 extends from sidewall 160 onto rear surface 170 of cell phone protector section 10. Locking protrusion 144 extends from sidewall 160 onto rear surface 170. Locking protrusion 146 extends from sidewall 160 onto rear surface 170. Locking protrusion 124 is parallel to and aligned with locking protrusion 144. Locking protrusion 126 is parallel to and aligned with locking protrusion 146. Locking protrusion 122 is slightly offset from locking protrusion 142.

The rear surface 170 further comprises openings 172, 174 and 176 to accommodate a camera and other operating components of a cell phone 900. Lower wall 180 includes an opening 182 to accommodate a charger. Upper wall 190 includes at least one opening 192 to accommodate an operating component to a cell phone.

Matching retaining section 200 includes matching protruding receiving members to receive and retain a respective protruding locking member from the cell phone protector section 110. The locking section 200 has a left wall 250 with a second protrusion receiving section 224 with an opening 225 to receive and retain locking protrusion 124 and a third protrusion receiving section 226 with an opening 227 to receive and retain locking protrusion 126. The locking section 200 has a right wall 260 with a second protrusion receiving section 244 with an opening 245 to receive and retain locking protrusion 144 and a third protrusion receiving section 246 with an opening 247 to receive and retain locking protrusion 146. In this way, the cell phone 900 is locking into cell phone protector section 110 by matching locking section 200. The bottom or lower wall 280 has gap 282 to match gap 182. Upper wall 290 includes an opening 229 to match gap 192.

Through the hard interior shell component 100 including sections 110 and 200 as previously described, the cell phone 900 is retained in a secure and locked position. The matching locking member 200 has an opening 210 surrounded by walls 250, 260, 280 and 290 so that the operating touch screen 910 of the cell phone 900 is accessible.

The second major component of the present invention is a soft exterior shell 300 which is press fit retained onto the interior hard shell 100 and its components 110 and 200.

The soft exterior shell 300 is made out of material selected from the group consisting of silicon and soft rubber. The soft exterior shell has a first sidewall 350 having an exterior sidewall surface 352, a front surface 354 and an interior side surface 356. The soft exterior shell has a second sidewall 360 having an exterior sidewall surface 362, a front surface 364 and an interior side surface 366. The soft exterior shell has a lower sidewall 380 having an exterior sidewall surface 382, a front surface 384 and an interior side surface 386. The soft exterior shell has a top sidewall 390 having an exterior sidewall surface 392, a front surface 394 and an interior side surface 396. The four walls 350, 360, 380 and 390 extend to a rear wall 370 having an exterior surface 372 and an interior surface 376.

The respective interior sidewall surfaces 356, 366, 386 and 396 and interior surface 376 of rear wall 370 form a pocket 320 into which is press fit retained the interior hard shell 100 with rear surface 170 pressed against interior surface 376 and exterior sidewall surfaces 352, 362, 283 and 392 respectively pressed against interior sidewall surfaces 356, 366, 386 and 396.

Rear wall 370 has openings so that protrusions from the interior retaining member 110 are visible through the rear surface 372. Locking protrusion 122 is visible through opening 362 in rear wall 370. Locking protrusion 124 is visible through opening 364 in rear wall 370. Locking protrusion 126 is visible through opening 366 in rear wall 370. Locking protrusion 142 is visible through opening 368 in rear wall 370. Locking protrusion 144 is visible through opening 374 in rear wall 370. Locking protrusion 144 is visible through opening 374 in rear wall 370. Locking protrusion 146 is visible through opening 378 in rear wall 370.

Although the rear surface 372 can be smooth, it is a significant advantage to have a multiplicity of bumps or ridges 400 on the rear 372 of rear wall 370 to provide improved gripping and to assure that the cell phone protector case 100 will not fall out of a pocket in which it is carried.

The exterior soft shell 370 can include matching openings to match openings in the interior hard shell case such as opening 375 to match openings 172, 174 and 176; opening 377 to match opening 182 and opening 379 to match opening 192.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A cell phone protector case comprising:
   a. the combination of an interior hard shell and a soft exterior shell made out of material selected from the group consisting of silicone and soft rubber, the interior hard shell is comprised of an interior cell phone protector section and a matching retaining section, the interior cell phone protector section includes a first gap, a second gap and a third gap on its left sidewall and a first gap, a second gap and a third gap on its right sidewall, on the left sidewall spaced within the first gap is a first locking protrusion, spaced between the second and third gaps is a second locking protrusion, and spaced adjacent the third gap is a third locking protrusion, on the right sidewall, spaced within the first gap is a first locking protrusion, spaced between the second and third gaps is a second locking protrusion, and spaced adjacent the third gap is a third locking protrusion;
   b. on the left sidewall the first locking protrusion extends from the left sidewall onto a rear surface of the cell phone protector section, the second locking protrusion extends from the left sidewall onto the rear surface of the cell phone protector section, and the third locking protrusion extends from the left sidewall onto the rear surface of the cell phone protector section;
   c. on the right sidewall the first locking protrusion extends from the right sidewall onto a rear surface of the cell phone protector section, the second locking protrusion extends from the right sidewall onto the rear surface of the cell phone protector section, and the third locking protrusion extends from the right sidewall onto the rear surface of the cell phone protector section;
   d. the respective second locking protrusions are parallel to each other and the respective third locking protrusions are parallel to each other;
   e. a matching retaining section includes matching protruding receiving members to receive and retain a respective protruding locking member from the cell phone protector section, the matching locking section has a left wall with a second protrusion receiving section with an opening to receive and retain the second locking protrusion from the left sidewall of the cell phone protector section, and a third protrusion receiving section with an opening to receive and retain the third locking protrusion from the left sidewall, the matching locking section has a right wall with a second protrusion receiving section with an opening to receive and retain the second locking protrusion from the right sidewall and a third protrusion receiving section with an opening to receive and a retain a third locking protrusion from the right sidewall;
   f. the matching locking member has an opening surrounded by its sidewalls, an upper wall and a lower wall;
   g. a soft exterior shell which is press fit retained onto the interior hard shell and its components, the soft exterior shell is made out of material selected from the group consisting of silicon and soft rubber, the soft exterior shell has a first sidewall having an exterior sidewall surface, a front surface and an interior side surface, the soft exterior shell has a second sidewall having an exterior sidewall surface, a front surface and an interior side surface, the soft exterior shell has a lower sidewall having an exterior sidewall surface, a front surface and an interior side surface, the soft exterior shell has a top sidewall having an exterior sidewall surface a front surface and an interior side surface, the four walls extend to a rear wall having an exterior surface 2 and an interior surface;

h. on the soft exterior shell, the respective interior sidewall surfaces and interior surface of the rear wall form a pocket into which is press fit retained the interior hard shell with its rear surface pressed against interior surface and exterior sidewall surfaces respectively pressed against the interior sidewall surfaces of the soft exterior shell;

i. the rear wall of the soft exterior shell has openings so that each of the three protrusions from the left and right sidewalls of the hard interior shell are visible through respective matching openings extending through the rear surface of the soft exterior shell; and j. the rear surface and sidewalls of the soft outer shell have a multiplicity of bumps thereon.

2. The cell phone protector case in accordance with claim 1, further comprising the interior hard shell case and its components are made of hard plastic.

3. A cell phone protector case comprising:
a. the combination of an interior hard shell and a soft exterior shell, the interior hard shell is comprised of an interior cell phone protector section and a matching retaining section, the interior cell phone protector section includes a first gap, a second gap and a third gap on its left sidewall and a first gap, a second gap and a third gap on its right sidewall, on the left sidewall spaced within the first gap is a first locking protrusion, spaced between the second and third gaps is a second locking protrusion, and spaced adjacent the third gap is a third locking protrusion, on the right sidewall spaced within the first gap is a first locking protrusion, spaced between the second and third gaps is a second locking protrusion, and spaced adjacent the third gap is a third locking protrusion;

b. on the left sidewall the first locking protrusion extends from the left sidewall onto a rear surface of the cell phone protector section, the second locking protrusion extends from the left sidewall onto the rear surface of the cell phone protector section, and the third locking protrusion extends from the left sidewall onto the rear surface of the cell phone protector section;

c. on the right sidewall the first locking protrusion extends from the right sidewall onto a rear surface of the cell phone protector section, the second locking protrusion extends from the right sidewall onto the rear surface of the cell phone protector section, and the third locking protrusion extends from the right sidewall onto the rear surface of the cell phone protector section;

d. a matching retaining section includes matching protruding receiving members to receive and retain a respective protruding locking member from the cell phone protector section, the matching locking section has a left wall with a second protrusion receiving section with an opening to receive and retain the second locking protrusion from the left sidewall of the cell phone protector section, and a third protrusion receiving section with an opening to receive and retain the third locking protrusion from the left sidewall, the matching locking section has a right wall with a second protrusion receiving section with an opening to receive and retain the second locking protrusion from the right sidewall and a third protrusion receiving section with an opening to receive and a retain a third locking protrusion from the right sidewall;

e the matching locking member has an opening surrounded by its sidewalls, an upper wall and a lower wall;

f. a soft exterior shell which is press fit retained onto the interior hard shell and its components, the soft exterior shell has a first sidewall having an exterior sidewall surface, a front surface and an interior side surface, the soft exterior shell has a second sidewall having an exterior sidewall surface, a front surface and an interior side surface, the soft exterior shell has a lower sidewall having an exterior sidewall surface, a front surface and an interior side surface, the soft exterior shell has a top sidewall having an exterior sidewall surface a front surface and an interior side surface, the four walls extend to a rear wall having an exterior surface and an interior surface;

h. on the soft exterior shell, the respective interior sidewall surfaces and interior surface of the rear wall form a pocket into which is press fit retained the interior hard shell with its rear surface pressed against interior surface and exterior sidewall surfaces respectively pressed against the interior sidewall surfaces of the soft exterior shell; and i. the rear wall of the soft exterior shell has openings so that each of the three protrusions from the left and right sidewalls of the hard interior shell are visible through respective matching openings extending through the rear surface of the soft exterior shell.

4. The cell phone protector case in accordance with claim 3, further comprising: the rear surface and sidewalls of the soft outer shell have a multiplicity of bumps thereon.

5. The cell phone protector case in accordance with claim 3, further comprising: the sidewalls of the soft outer shell conceal the matching protruding receiving members.

6. The cell phone protector case in accordance with claim 3, further comprising: the interior hard shell case and its components are made of hard plastic.

7. The cell phone protector case in accordance with claim 3, further comprising: the interior hard shell case and its components are made of hard plastic.

* * * * *